United States Patent
Shapiro et al.

(10) Patent No.: US 12,093,965 B1
(45) Date of Patent: Sep. 17, 2024

(54) SYSTEMS AND METHODS FOR GENERATING RESPONSE RECORDS FOR INDIVIDUAL USERS BASED ON USER RESPONSES TO PROMPTS

(71) Applicants: Dmitry Shapiro, Spring Valley, CA (US); Sean Edward Thielen, New York, NY (US)

(72) Inventors: Dmitry Shapiro, Spring Valley, CA (US); Sean Edward Thielen, New York, NY (US)

( * ) Notice: Subject to any disclaimer, the term of this patent is extended or adjusted under 35 U.S.C. 154(b) by 0 days.

(21) Appl. No.: 18/466,594

(22) Filed: Sep. 13, 2023

(51) Int. Cl.
*G06Q 30/015* (2023.01)

(52) U.S. Cl.
CPC .................. *G06Q 30/015* (2023.01)

(58) Field of Classification Search
CPC .......... G06F 40/134; G06F 9/54; G06F 40/30; G06F 40/56; G06F 40/20; G06F 40/279; G06F 40/35; G06F 40/256; G06N 5/01; G06N 20/00
USPC ................... 704/2, 9, 275; 715/208
See application file for complete search history.

(56) References Cited

U.S. PATENT DOCUMENTS

| | | | |
|---|---|---|---|
| 10,978,090 B2 * | 4/2021 | Binder | G10L 15/26 |
| 11,681,505 B2 | 6/2023 | Mukherjee | |
| 2016/0342317 A1 | 11/2016 | Lim | |
| 2020/0184065 A1 | 6/2020 | Toth | |
| 2023/0094646 A1 * | 3/2023 | Mittal | G06N 5/041 |
| | | | 704/9 |
| 2023/0245651 A1 * | 8/2023 | Wang | G06N 5/022 |
| | | | 704/275 |
| 2023/0252224 A1 * | 8/2023 | Tran | G06F 40/56 |
| | | | 715/256 |
| 2023/0252233 A1 * | 8/2023 | Gutierrez | G06F 40/20 |
| | | | 704/9 |
| 2023/0259705 A1 * | 8/2023 | Tunstall-Pedoe | G06N 5/01 |
| | | | 704/9 |
| 2023/0273958 A1 * | 8/2023 | Laliberte | G06F 40/134 |
| | | | 715/208 |
| 2023/0273959 A1 * | 8/2023 | Laliberte | G06F 40/30 |
| | | | 715/208 |
| 2023/0274086 A1 * | 8/2023 | Tunstall-Pedoe | G06F 40/56 |
| | | | 704/9 |

(Continued)

OTHER PUBLICATIONS

Anonymous, User Interface and Application Programming Interface for Explaining Personalized Machine-Learned Model Outputs, Jan. 3, 2018, IP.com, pp. 1-34. Retrieved from the Internet: <URL https://priorart.ip.com/IPCOM/000252271:>. (Year: 2018).

(Continued)

*Primary Examiner* — Olusegun Goyea
(74) *Attorney, Agent, or Firm* — Esplin & Associates, PC

(57) ABSTRACT

Systems and methods for generating response records for individual users based on user responses to prompts. Exemplary implementations may: provide prompts to individual users, receive user input from individual ones of the users indicating responses to the one or more provided prompts; determine, based on the received user input from individual ones of the users, response information for individual ones of the responses to the prompts; aggregate the individual responses and corresponding response information to generate response records for individual ones of the users; store the response records for individual ones in the users; and/or other exemplary implementations.

20 Claims, 6 Drawing Sheets

(56) References Cited

U.S. PATENT DOCUMENTS

| | | | | |
|---|---|---|---|---|
| 2023/0274089 A1* | 8/2023 | Tunstall-Pedoe | ..... | G06F 40/279 704/2 |
| 2023/0274094 A1* | 8/2023 | Tunstall-Pedoe | ....... | G06F 40/30 704/9 |
| 2023/0281249 A1* | 9/2023 | Laliberte | ............... | G06F 40/134 715/208 |
| 2023/0316006 A1* | 10/2023 | Tunstall-Pedoe | ..... | G06F 40/205 704/9 |
| 2023/0325590 A1* | 10/2023 | Shevchenko | ............ | G06N 5/04 715/200 |
| 2023/0341950 A1* | 10/2023 | Margot | ................. | G06F 3/0236 |
| 2023/0385085 A1* | 11/2023 | Singh | ...................... | G06N 7/01 |
| 2023/0393870 A1* | 12/2023 | Singh | ..................... | G06N 20/00 |

OTHER PUBLICATIONS

Ouyang, Long, et al. "Training language models to follow instructions with human feedback." Advances in Neural Information Processing Systems 35 (2022): 27730-27744. (Year: 2022).

Pook, Stuart. "Interaction and Context in Zoomable User Interfaces." École Nationale Supérieure des Télécommunications. Paris, France (2001). (Year: 2001) 260 pages.

* cited by examiner

SYSTEMS AND METHODS FOR GENERATING RESPONSE RECORDS FOR INDIVIDUAL USERS BASED ON USER RESPONSES TO PROMPTS

FIELD OF THE DISCLOSURE

The present disclosure relates to systems and methods for generating response records for individual users based on user responses to prompts.

BACKGROUND

Large language models for text summarization and text generation are known. Chatbots, virtual assistants, conversational AI, and other types of interactive language models are known.

SUMMARY

Machine learning may be utilized to perform and optimize an endless number of tasks. Recently, large language models for generating content have become a popular application of machine learning. One downfall of these models is a lack of personalization and customization. For example, a model configured to summarize news articles will output the same summary regardless of the user that requested the summary. A summary generated for a college professor should be different than a summary of the same article generated for a high schooler. Different users of different ages, backgrounds, educations, and other characteristics may be better served by models capable of factoring in these aspects and generating personalized output. In order to expedite the personalization and customization of these models, user records and/or profiles may be aggregated for individual users. The user records may include data that describes and characterizes the individual users. This data may include user responses to prompts, user demographic information, social media history, and other information. These user records may be utilized to group users into similar clusters, generate predictions and/or recommendations, and/or otherwise be used in the customization of models.

One or more aspects of the present disclosure include a system for generating response records for individual users based on user responses to prompts. The system may include electronic storage, one or more hardware processors configured by machine-readable instructions, and/or other components. Executing the machine-readable instructions may cause the one or more hardware processors to facilitate generating response records for individual users based on user responses to prompts. The machine-readable instructions may include one or more computer program components. The one or more computer program components may include one or more of a prompt component, an input component, a record component, and/or other components.

The prompt component may be configured to provide prompts to individual users. The prompts may be provided via one or more client computing platforms associated with individual ones of the users. By way of non-limiting illustration, a first prompt may be provided to a first user via a first client computing platform associated with the first user.

The input component may be configured to receive user input from individual ones of the users. User input from individual ones of the users may indicate responses to the one or more provided prompts. By way of non-limiting illustration, user input from the first user may indicate a first response to the first prompt.

The input component may be configured to determine, based on the received user input from individual ones of the users, response information for individual ones of the responses to the prompts. Response information for an individual response may describe one or more of the content of the individual response, the context of the individual response, and/or other information characterizing the individual response. By way of non-limiting illustration, response information may be determined for the first response.

The record component may be configured to aggregate the individual responses, corresponding response information, and/or other information to generate response records for individual ones of the users. The response records for individual ones of the users may be structured for use within an application marketplace that facilitates use of individual applications by individual users. The individual applications may utilize one or more models to perform application functions. The one or more models may be capable of being refined based on response records for individual ones of the users to customized outputs generated by the individual models for individual ones of the users. By way of non-limiting illustration, a first response record for the first user may be aggregated based on one or more of the first response, response information for the first response, and/or other information.

The record component may be configured to store the response records for individual ones in the users. By way of non-limiting illustration, the first response record for the first user may be stored.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
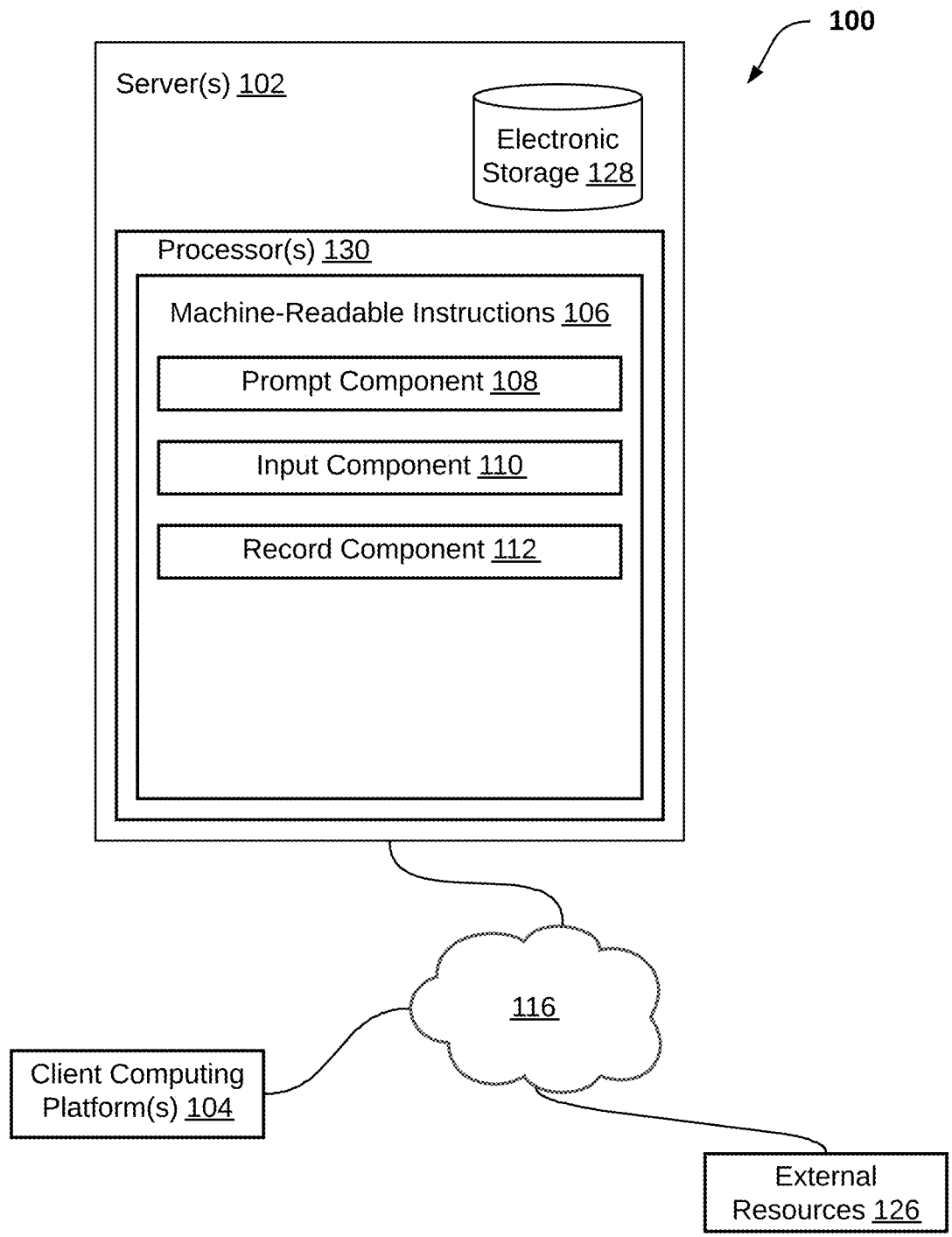
FIG. 1 illustrates a system for generating response records for individual users based on user responses to prompts, in accordance with one or more implementations.

FIG. 1 illustrates a system 100 configured for generating response records for individual users based on user responses to prompts, in accordance with one or more implementations. In some implementations, system 100 may include one or more server(s) 102, electronic storage 128, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Executing the machine-readable instructions 106 may cause server(s) 102 to facilitate generating response records for individual users based on user responses to prompts. Machine-readable instructions 106 may include one or more instruction components. The instruction components may include computer program components. The instruction components may include one or more of prompt component 108, input component 110, record component 112, and/or other instruction components.

Prompt component 108 may be configured to provide prompts to individual users. The prompts may be provided via one or more client computing platform(s) 104 associated with individual ones of the users. By way of non-limiting illustration, a first prompt may be provided and/or presented to a first user via a first client computing platform associated with the first user. The first prompt may include a question, statement, interactive activity, and/or other type of prompt. For example, an interactive prompt may be a series of mathematical equations. A response by the first user to the interactive activity prompt may include one or more answers to the mathematical equations. In some implementations, the prompt may be provided and/or presented along with one or more response options. By way of non-limiting illustration, the first prompt may be presented on a user interface of the first client computing platform associated with the first user. The user interface may display a question ("Which season do you prefer?") and one or more response options corresponding to the provided question (e.g., spring, summer, fall, and winter). The response options corresponding to the provided question may be selectable by the first user.

Similar and/or the same prompts may be provided to the same users at different times to determine changes in the characteristics and/or preferences of the users. In some implementations, prompt component 108 may be configured to generate and/or provide prompts to individual ones of the users based on responses, by individual ones of the users, to previously provided prompts. By way of non-limiting illustration, prompt component 108 may generate and provide a first subsequent prompt based on one or more responses by the first user to one or more previously provided prompts. The first subsequent prompt may be generated in order to obtain information pertaining to the first user that has not yet been obtained through the one or more previously provided prompts. In some implementations, prompt component 108 may be configured to provide prompts to individual ones of the users, responsive to the same prompts being previously provided to the users. The prompts may be provided responsive to the amount of time between previous occurrences of the prompts being provided and the present time meeting or exceeding a threshold. By way of non-limiting illustration, a first prompt may have been provided to the first user at a previous time. Responsive to the time between the previous time and the current time meeting and/or exceeding a threshold, the first prompt may be provided to the first user a second time. The threshold may be one week, one month, one year, and/or other durations of time. In some implementations, the threshold may be determined based on the number of prompts provided to the users. For example, the first prompt may be provided to the first user again responsive to a determination that 100 prompts and/or other numbers of prompts have been provided to the user between the present time and the first occurrence of the first prompt being provided.

In some implementations, subsequent prompts may be provided to users based on their responses to previous responses. By way of non-limiting illustration, a first prompt may be provided to individual users. The first prompt may be provided with a first response option, a second response option, and/or other selectable response options. Individual users that select the first response option may be provided with a first subsequent prompt and individual users that select the second response option may be provided with a second subsequent prompt. The first subsequent prompt may be different than the second subsequent prompt.

In some implementations, prompt component 108 may be configured to obtain user social information, user demographic information, and/or other information associated with individual ones of the users. User demographic information may include user's age, sex, marital status, height and weight, occupation, and/or other such characteristics. User social information may include data related to user's profile stored in connection with user's account with a social networking system. User social information may include information related to user hobbies, preferences, recent public posts, interactions with other members within the social networking system. In some implementations, prompt component 108 may be configured to obtain geolocation information describing geographical locations associated with individual ones of the users. Prompt 108 may be configured to generate and/or provide one or more prompts based on obtained user social information, user demographic information, geolocation information, and/or other information associated with individual ones of the users.

In some implementations, prompt component 108 may be configured to present a scrollable feed to the first user on the user interface of the first client computing platform associated with the first user. The scrollable feed may present individual displays of a series of displays. Individual displays may include individual prompts and/or other information. In some implementations, the scrollable feed may present one display at a time and/or one prompt at a time. The scrollable feed may be infinitely scrollable, or the scrollable feed may terminate responsive to the first user being presented all the displays of the series of displays. By way of non-limiting illustration, a first display including a first prompt may be presented to the first user. Responsive to user input providing a response to the first prompt, a second display including a second prompt may presented to the first user.

In some implementations, a series of displays may correspond with a set of prompts. Individual sets of prompts may include one or more prompts to provide to individual ones of the users. Individual prompts of a set of prompts may be provided to ascertain specific user characteristics, attributes, and/or other information. By way of non-limiting illustration, user response(s) to one or more prompts of a given set of prompts may facilitate determination of the user's interest in international politics. In some implementations, individual sets of prompts may be provided to individual ones of the users based on user demographic information that describes the users. By way of non-limiting illustration, a first set of prompts may be provided to female users between the ages of 35-40, a second set of prompts may be provided to male users between the ages of 65-75. Prompts of the first set of prompts may be separate and distinct from prompts of the second set of prompts. In some implementations, the first set of prompts and the second set of prompts may include one, two, and/or other numbers of the same prompts. An individual user may be provided with one or more sets of prompts on the scrollable feed.

Input component 110 may be configured to receive user input from individual ones of the users (e.g., via client computing platform(s) 104). User input may include tapping, double tapping, swiping, sliding, and/or other user gestures. User input from individual ones of the users may indicate responses to the one or more provided prompts. By way of non-limiting illustration, user input from the first user may indicate a first response to the first prompt. In some implementations, user input may indicate a user abstaining from responding to the provided prompt and/or skipping the provided prompt.

Input component 110 may be configured to determine, based on the received user input from individual ones of the users, response information for individual ones of the responses to the prompts. By way of non-limiting illustration, response information may be determined for the first response. The response information for an individual response may describe the content of the individual response, the context of the individual response, and/or other information characterizing the individual response. Content of the individual response may include text content, video content, audio content, and/or other types of content. The content may be included in a response option selected by the user in response to a provided prompt. The context of the individual response may relate to and/or describe the nature of response by the users. The context of the individual response may include response time, response accuracy, and/or other information. For example, response time, for an individual response, may specify an amount of time between a prompt being presented to the first user and submission, by the first user, of a response to the prompt. Response accuracy may specify whether the answer and/or response submitted by the first user is the correct answer to the presented prompt (e.g., a mathematical equation).

Record component 110 may be configured to aggregate the individual responses, corresponding response information, and/or other information to generate response records for individual ones of the users. By way of non-limiting illustration, a first response record for the first user may be aggregated based on the first response, response information for the first response, and/or other information. The response records for individual ones of the users may be structured for use within an application marketplace that facilitates use of individual applications by individual users. The individual applications may utilize one or more models to perform application functions. The one or more models may include predictive models, neural networks, Bayesian networks, expert systems, decision tress, collections of decisions tress, support vector machines, and/or other types of models and/or systems. The configurations of the one or more models may be dependent on the desired functionality of the particular application that utilizes the one or more models. The one or more models may be publicly available models (e.g., GPT-3, GPT-3.5, GPT-4, Claude-v1, Claude-v2, Claude Instant, etc.), private models, and/or other types of models. Publicly available models may be obtained from external resources 126 via network(s) 116 and/or other sources. Private models may be uploaded by developing users (e.g., via client computing platform(s) 104), obtained from electronic storage 128, and/or other sources. The one or more applications accessible via the application marketplace may be developed and/or published by one or more developing users.

The one or more models may be refined based on response records for individual ones of the users to customized outputs generated by the individual models for individual ones of the users. In some implementations, refining the one or more models may include training the one or more models on training information and/or other information. The training information may include the response record for individual ones of the users and/or other information. The one or more models may utilize training techniques such as supervised learning, semi-supervised learning, unsupervised learning, reinforcement learning, and/or other techniques. In some implementations, refining the one or more models may include modifying a context window corresponding to the models. Modifying the content window may include modifying the size of inputs capable of being processed by the models. In some implementations, refining the one or more models may include modifying and/or filtering one or more outputs generated by the models. By way of non-limiting illustration, refining the one or more models may include generating and/or a modifying an output layer of one or more models based on response(s) by the first user (and/or other users) to prompts, the first response record, and/or other information.

In some implementations, the one or more models may be refined based on responses by users to supplemental prompts. The supplemental prompts may be associated with individual applications that utilize the one or more models to perform application functions. The supplemental prompts may be provided to users responsive to selection of the associated application (e.g., from a selection interface of the application marketplace). In some implementations, responses to the supplemental prompts may facilitate customization (for the selecting user) of the one or more models that perform application functions. Training information for training the one or more models my include responses to the supplemental prompts and/or other information.

Record component 112 may be configured to store the response records for individual ones of the users. By way of non-limiting illustration, the first response record for the first user may be stored. The response records for individual ones of the users may be stored in electronic storage 128. Individual response records for individual ones of the users may include responses by individual ones of the users to prompts, response information corresponding to individual ones of the responses, and/or other information.

In some implementations, the first response record and/or the first user may be identifiable by a unique identifier (UID). The UID associated with the first user may facilitate identification of the first response record as corresponding with the first user. In some implementations, the unique identifier associated with the first user may facilitate identification and/or updates to the first response record responsive to detection of responses by the first user to one or more provided prompts. In some implementations, the UID associated with the first user may be generated responsive to creation of a user account by the first user. Creation of a user account by the first user may generate user account information for the first user. Electronic storage 128 may store user account information associated individual ones of the users. User account information associated with an individual user may include a UID associated with the individual user and/or a response record for the individual user. In some implementations, user account information may include identification information (e.g., name, birthday, email address, etc.), demographic information (e.g., age, race, gender, income, education, employment, etc.), and/or other information.

Responses included in the first response record may include text, image, audio, video, sensor data, and/or other types of content. The content included in the stored responses may include content selected and/or entered by the first user in response to one or more provided prompts. By way of non-limiting illustration, a prompt provided to the first user via a client computing platform 104 associated with the first user may be a question (e.g., "Which interior design style do you prefer?"), statement (e.g., "Choose your preferred interior design style."), and/or other type of prompt. A user interface of the client computing platform 102 may display one or more images and/or other content corresponding to the provided prompt (e.g., two or more images depicting different interior design styles), and/or other user interface elements. In some implementations, the one or more images and/or other content may be displayed simultaneously with the prompt. A response by the first user to the prompt may include selection of an image. The selected image may be stored in the first response record. In some implementations, the selected image may be stored in conjunction with the prompt. Responses within individual response records may be stored in an unstructured format, semi-structured format, and/or other data formats. By way of non-limiting illustration, a response record having an unstructured format may store responses in one or more? files without an organizational schema. A response record having a semi-structured format may store responses in a tree-like structure, graph structure, and/or other data structures. In some implementations, response records and/or responses for individual ones of the users may be obtained (e.g., from external resource(s) 126 via network(s) 116) and/or imported by the individual users (e.g., via client computing platform(s) 104).

In some implementations, record component 112 may be configured to analyze the response records for individual ones of the users. Analyzing individual responses may include identifying characteristics and/or features that describe individual ones of the users. Record component 112 may utilize one or more models to perform analysis on the response records for individual ones of the users. The one or more models may be stored in electronic storage 128 and/or obtained from external resource(s) 126. In some implementations, analyzing responses records may include determining values of attributes for individual ones of the users. Attributes may include traits, demographics, characteristics, preferences, and/or other aspects of the users. By way of non-limiting illustration, a first attribute may be interest in international politics. Based on the first response record for the first user, record component 112 may determine a first value for the first attribute and/or other values for other attributes. The first value for the first attribute may be low interest, moderate interest, high interest, and/or other values. The first value for the first attribute may be a numerical value. The first value for the first attribute may be based on a comparison between the first response record and one or more other response records for one or more other individual users. Values of attributes for individual ones of the users may be stored in the response records for individual ones of the users and/or user account information associated with individual ones of the users. In some implementations, the values of attributes for users may be determined in an ongoing manner. In other words, the values of attributes that describe a given user may change and/or fluctuate as the given user provides more responses to provided prompts and/or the response record for the given user is updated with new response information.

In some implementations, analyzing the response records for individual ones of the users may include identifying, based on the response records for individual ones of the users, one or more user phenotypes and/or other user classifications. An individual user phenotype may describe a group of users having similar characteristics and/or features. By way of non-limiting illustration, a first user phenotype and a second user phenotype may be identified. The first user phenotype may describe a first group of users and the second user phenotype may describe a second group of users. The first group of users may be separate and distinct from the second group of users. In some implementations, user phenotypes for individual users may be based on values of attributes that describe the individual user. Individual user phenotypes may correspond with individual values and/or range of values of attributes. By way of non-limiting illustration, the first user phenotype may correspond with a first range of values for a first attribute. A given user may be identified as belonging to the first user phenotype responsive to a response record for the given user indicating a first value for the first attribute and the first value being within the first range of values. In some implementations, the one or more models may be capable of being refined for an individual user. The one or more models may be capable of being refined based on characteristics and/or features corresponding with a user phenotype that the individual user belongs to. By way of non-limiting illustration, training information may include values of attributes associated with a user phenotype that the individual user belongs to.

In some implementations, prompt component 108 may be configured to, for individual ones of the user phenotypes, determine prompt recommendations, application recommendations, and/or other types of recommendations. The determination(s) may be based on characteristics and/or features that describe users belonging to individual ones of the user phenotypes. Prompt recommendations may include one or more prompts to provide to users belonging to individual ones of the user phenotypes. By way of non-limiting illustration, a prompt recommendation including a given prompt may be determined for the first user phenotype. Prompt component 108 may be configured to provide the prompts identified by the prompt recommendations. The prompts may be provided via client computing platform(s) 104 associated with individual users belonging to individual ones of the user phenotypes. By way of non-limiting illustration, the given prompt may be provided to individual users belonging to the first user phenotype.

An individual application recommendation for an individual user phenotype may include one or more applications. Record component 112 may be configured to provide the application recommendations to individual users belonging to individual ones of the user phenotypes for which the application recommendations are determined. Application recommendations for a given user belonging to the first user phenotype may be based on application use by other individual users belonging to the first user phenotype. For example, a first application may be recommended to the first user responsive to a threshold number and/or percentage of users belonging to the first user phenotype having used the first application. In some implementations, application recommendations may be based on user ratings of applications. For example, applications having relatively high ratings by users belonging to the first user phenotype may be recommended to other users belonging to the first user phenotype.

In some implementations, prompt component 108 may be configured to determine prompt recommendations, application recommendations, and/or other types of recommendations for individual ones of the user based on response records for individual ones of the users. The prompt recommendations may include one or more prompts to provide to individual ones of the users. The application recommendations may include one or more applications to recommend and/or provide to individual ones of the users. By way of non-limiting illustration, recommendations may be based on values of attributes that describe individual ones of the users. Individual prompts and/or applications may correspond to specific values and/or range of values of attributes. By way of non-limiting illustration, a first prompt may correspond with a first range of values of a first attribute. Individual users having values of the first attribute within the first range of values may be provided prompt recommendations that indicate the first prompt and/or may be provided the first prompt.

In some implementations, prompt component 108 may be configured to determine response predictions for individual prompts for individual ones of the users. The response predictions may be determined based on characteristics and/or features that describe individual ones of the users and/or other information. In some implementations, the response predictions for an individual user may be based on responses by one or more other users having the same and/or similar characteristics and/or features to the individual user.

Prompt component 108 may be configured to utilize one or more models to generate response predictions for individual prompts for individual ones of the users. The one or more models for generating response predictions for individual prompts for individual ones of the users may be configured to receive input. Input to the one or models may include one or more response records, user phenotype information, and/or other information. By way of non-limiting illustration, the one or more models may be configured to receive a response record for a given user, one or more response records for one or more users having the same and/or similar characteristics as the given user, user phenotype information describing a user phenotype the given user belongs to, and/or other information. The one or more models may be configured to generate and/or output response predictions for the given user based on the received input.

In some implementations, prompt component 108 may be configured to provide the individual prompts for which response predictions are generated to the users. Input component 110 may be configured to receive user input indicating responses by the users to the provided prompts. Input component 110 may be configured to compare the actual responses by the users to the response predictions to generate prediction information. Prediction information may describe differences between actual responses provided by the users and response predictions generated by the one or more models. Prompt component 108 may be configured to refine and/or retrain the one or more models for generating response predictions based on the prediction information and/or other information.

Figure 3:
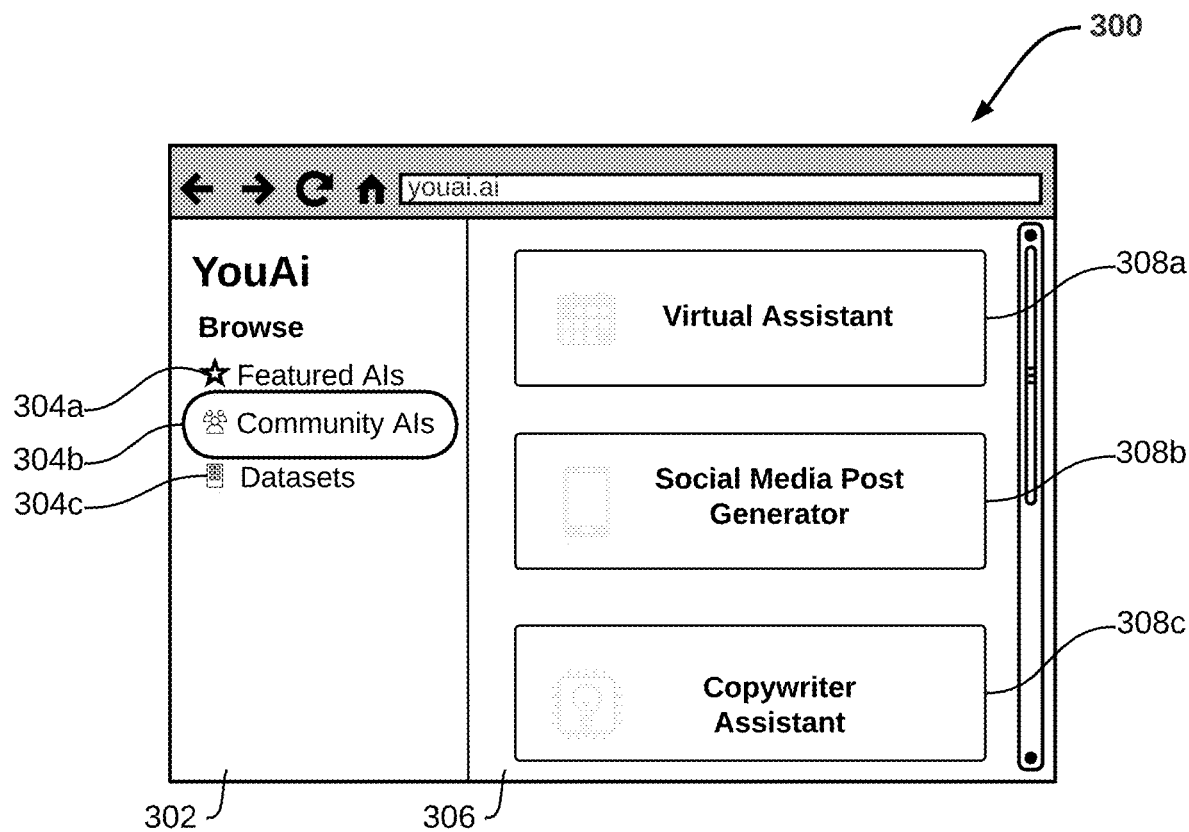
FIG. 3 illustrates a user interface, in accordance with one or more implementations.

FIG. 3 illustrates a user interface 300 that may be used by a system to generate response records for individual users based on user responses to prompts. User interface 300 may illustrate a selection interface including a first portion 302, a second portion 306, and/or other portions. The selection interface may be presented responsive to a user accessing an application marketplace via one or more client computing platforms. First portion 302 may include one or more interface elements 304*a-c* that are selectable by the user. Selection of individual ones of the interface elements 304*a-c* may facilitate modifications to displays in second portion 306. By way of non-limiting illustration, second portion 306 includes a display associated with selection of interface element 304*b*. Second portion 306 may display a selection interface, responsive to selection of interface element 304*b*. The selection interface may include one or more of a first interface element 308*a*, a second interface element 308*b*, a third interface element 308*c*, and/or other interface elements. The interface elements included in the selection interface may be selectable by the user. Individual ones of the interface elements included in the selection interface may correspond to applications. For example, first interface element 308*a* may correspond with a first application ("Virtual Assistant), second interface element 308*b* may correspond with a second application ("Social Media Post Generator"), third interface element 308*c* may correspond with a third application ("Copywriter Assistant"), and so on and so forth. The individual applications associated with the interface elements may perform different tasks and/or functions. Selection of an individual interface element may facilitate use of the corresponding application by the user.

Figure 4:
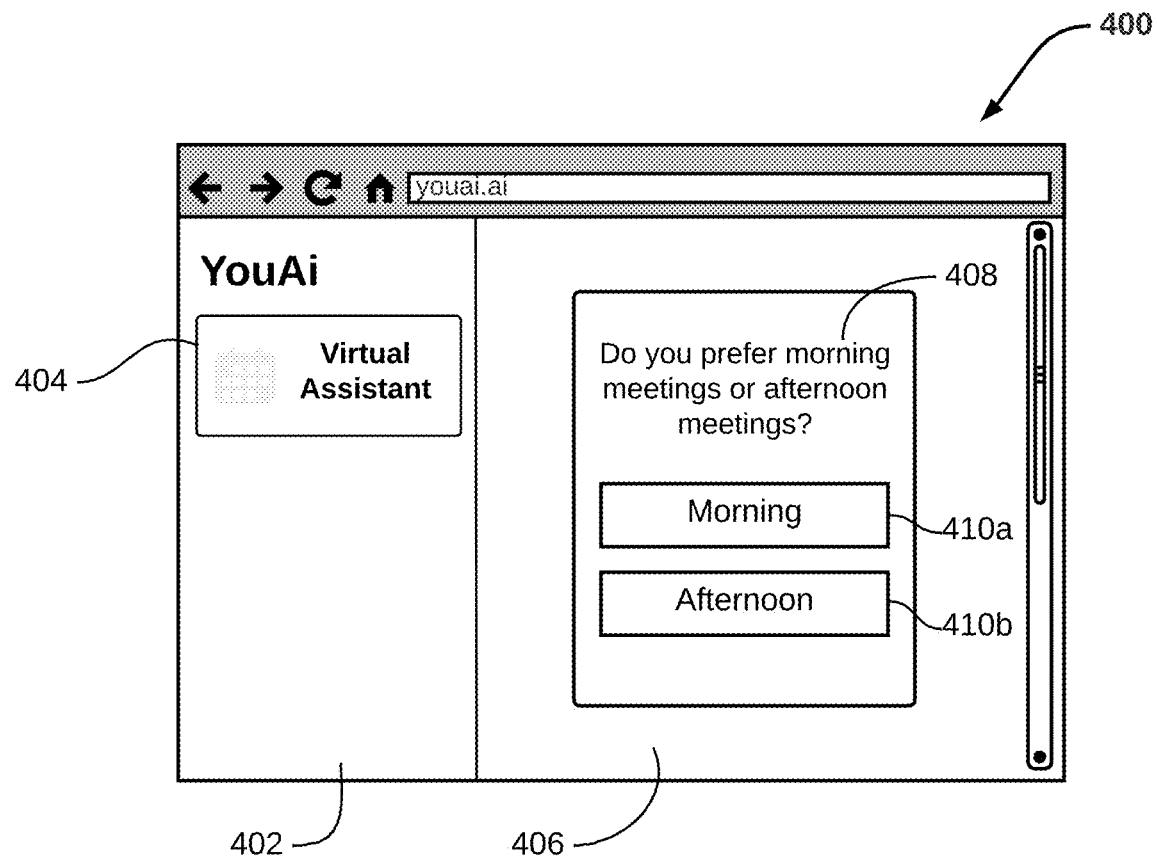
FIG. 4 illustrates a user interface, in accordance with one or more implementations.

FIG. 4 illustrates a user interface 400 that may be used by a system to generate response records for individual users based on user responses to prompts. User interface 400 may include a first portion 402, a second portion 406, and/or other portions. First portion 402 may include a first interface element 404. First interface element 404 may indicate and/or be associated with a first application. User interface 400 includes a display that may be presented responsive to selection of an interface element corresponding with the first application (e.g., from a selection interface the same as or similar to the selection interface shown in FIG. 3). Second portion 406 may present one or more supplemental prompts associated with the first application. The one or more supplemental prompts may include a first supplemental prompt 408. First supplemental prompt 408 may be presented to a user via second portion 406. Second portion 406 may further include a second interface element 410*a*, a third interface element 410*b*, and/or other interface elements. Second interface element 410*a* may correspond with a first response option to first supplemental prompt 408. Third interface element 410*b* may correspond with a second response option to first supplemental prompt 408. Second interface element 410*a* and third interface element 410*b* may be selectable by the user. Selection of one of the interface elements 410*a-b* may indicate a response by the user to first supplemental prompt 408. The one or more models for performing application functions of the first application may be refined based on a response record for the user, a response by the user to first supplemental prompt 408, and/or other information.

Figure 5:
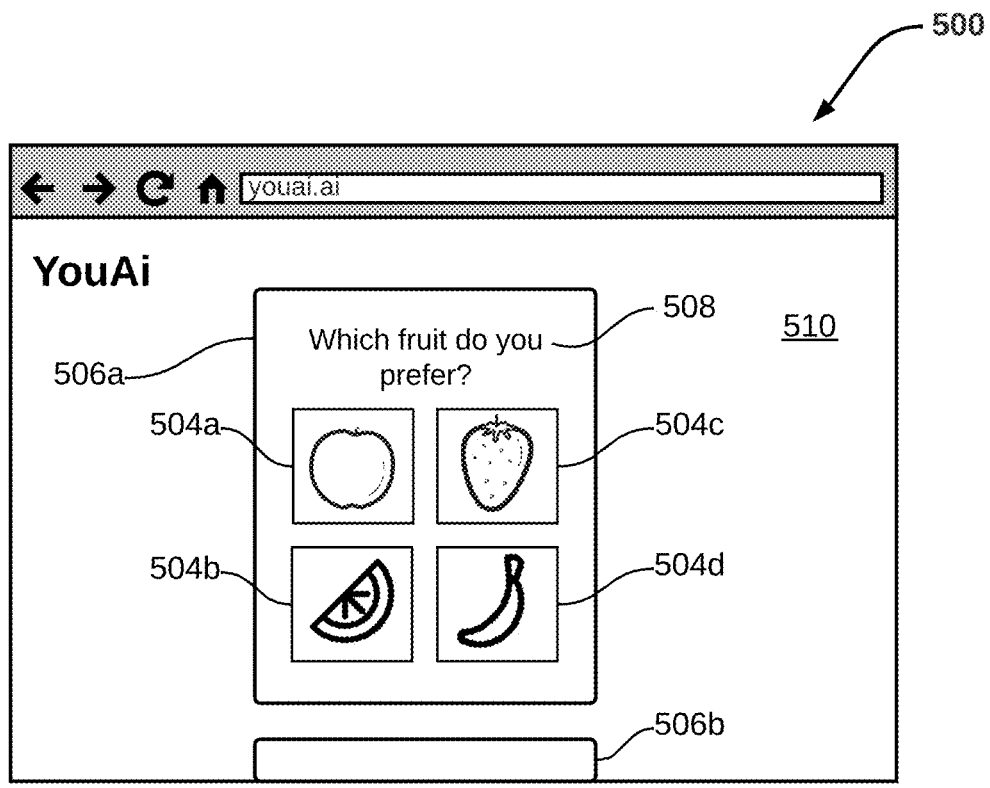
FIG. 5 illustrates a user interface, in accordance with one or more implementations.

FIG. 5 illustrates a user interface 500 that may be used by a system to generate response records for individual users based on user responses to prompts. User interface 500 may include a scrollable feed 510. Scrollable feed 510 may present individual displays of a series of displays. The series of displays may include a first display 506a, a second display 506b, and/or other displays. First display 506a may include a first prompt 508. First display 506a may further include a first button 504a, a second button 504b, a third button 504c, a fourth button 504d, and/or other user interface elements. Individual ones of buttons 504a-d may correspond to individual response options to first prompt 508. For example, first button 504a may correspond to a first response option, second button 504b may correspond to a second response option, and so on and so forth. In some implementations, user input selecting a response option (e.g., selection of one or more buttons 504a-d) may facilitate presentation of second display 506b. In some implementations, second display 506b may be presented responsive to user input indicating skipping first prompt 508 (e.g., swiping from the bottom to the top of user interface 500).

Figure 6:
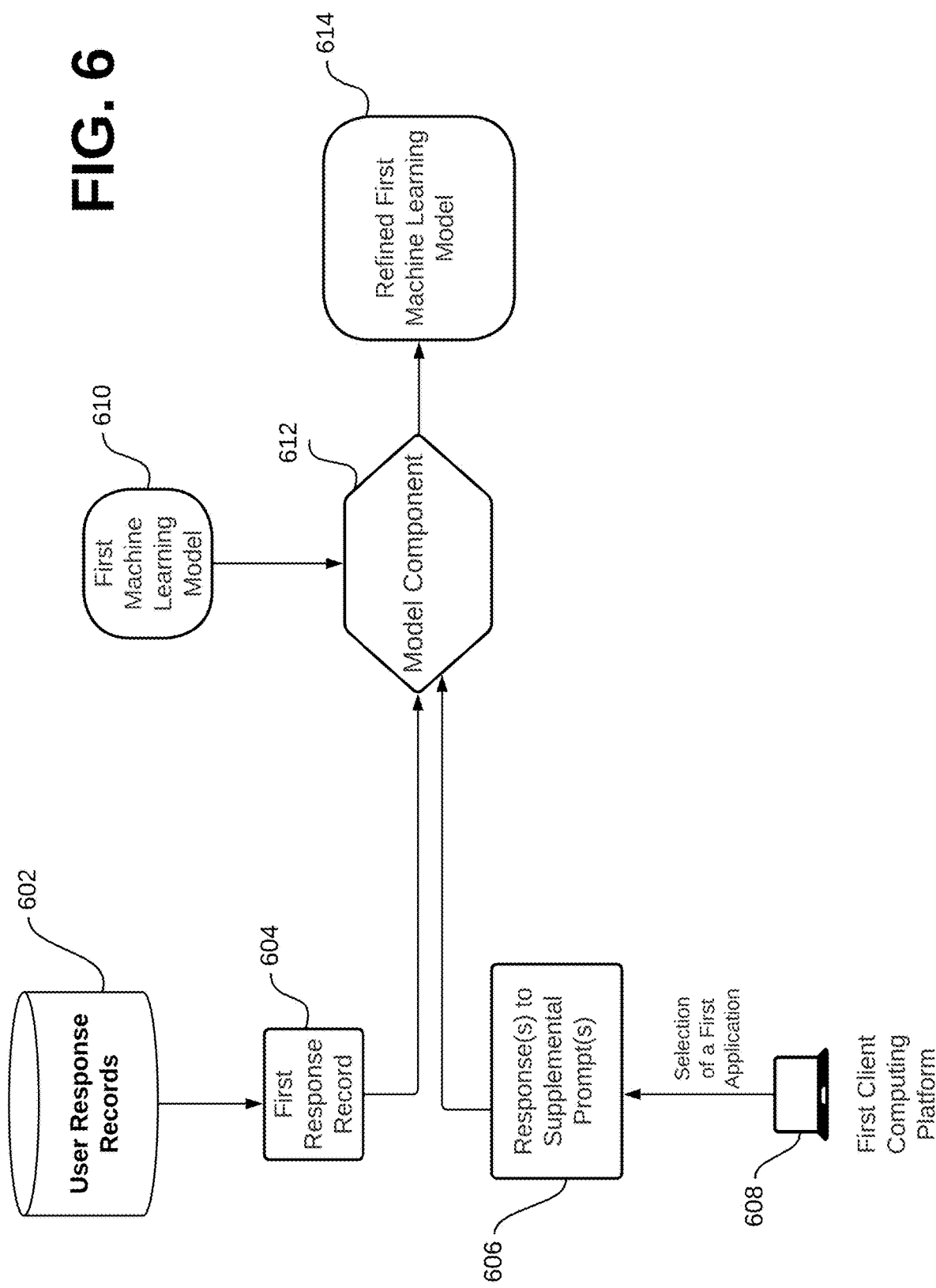
FIG. 6 illustrates an exemplary implementation of a system for generating response records for individual users based on user responses to prompts.

FIG. 6 illustrates an exemplary implementation of a system to generate response records for individual users based on user responses to prompts. The system may include a database of user response records 602 (e.g., the same as or similar to electronic storage 128). The database may include user response records for individual users including a first response record 604. First response record 604 may include responses provided by a first user to one or more prompts. The first user may provide response(s) to one or more supplemental prompts 606 via a first client computing platform 608 associated with the first user. First client computing platform may be the same as or similar to client computing platform(s) 104. The supplemental prompts may be provided to the first user responsive to selection of a first application. In some implementations, the supplemental prompts provided to the first user may be associated with the first application. The first application may utilize a first machine learning model 610 and/or other models to perform application functions. Model component 612 may be configured to refine the first machine learning model 610 based on the first response record 604 for the first user, response(s) to the supplemental prompts 606 by the first user, and/or other information. In some implementations, refining the first machine learning model 610 may include modifying the first machine learning model 610 to generate a refined first machine learning model 614. The refined first machine learning model 614 may be provided to the first user (e.g., via first client computing platform 608).

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user corresponding to the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
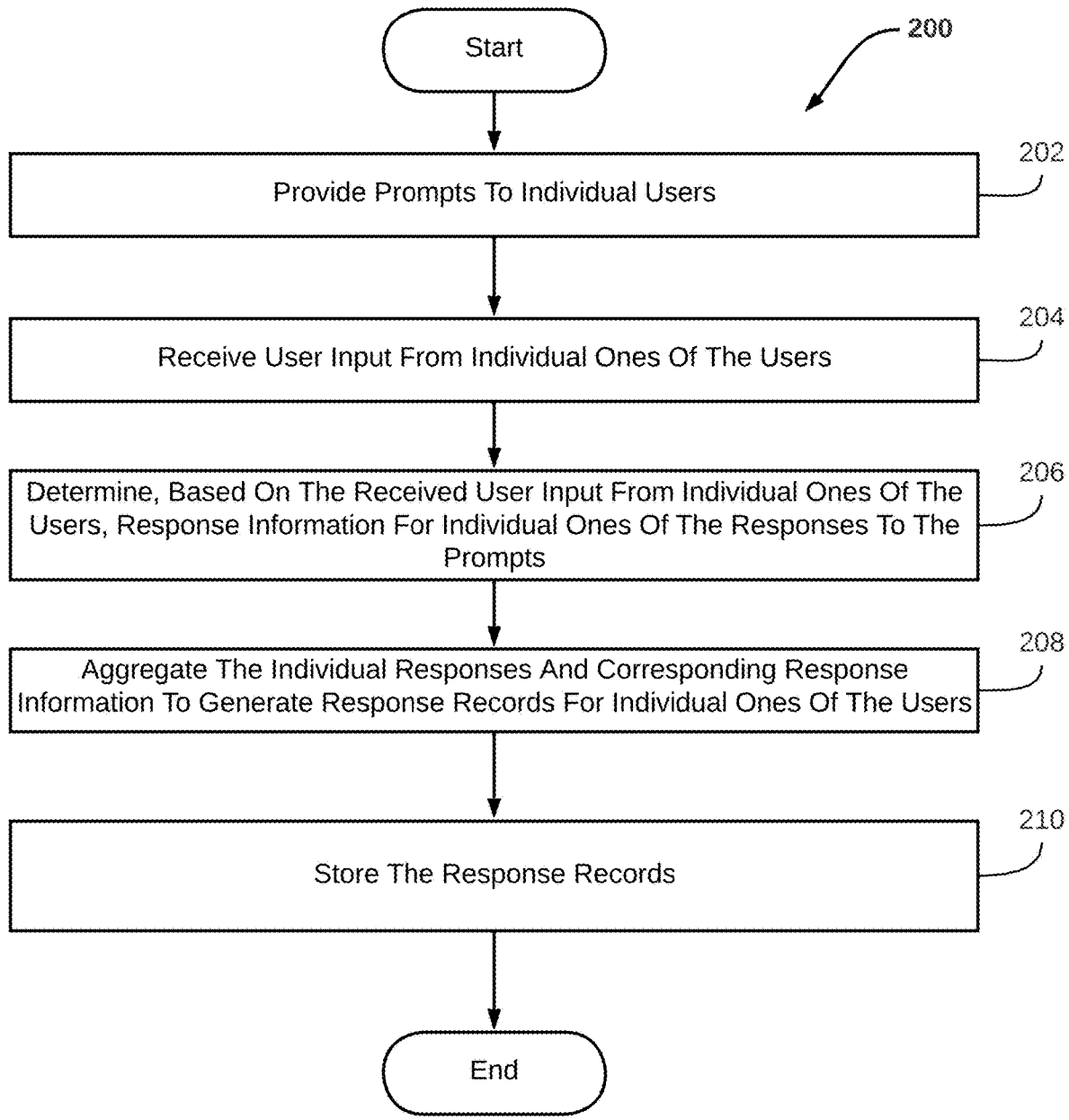
FIG. 2 illustrates a method for generating response records for individual users based on user responses to prompts, in accordance with one or more implementations.

FIG. 2 illustrates a method 200 for generating response records for individual users based on user responses to prompts, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include providing prompts to individual users. The prompts may be provided via one or more client computing platforms associated with individual ones of the users. By way of non-limiting illustration, a first prompt may be provided to a first user via a first client computing platform associated with the first user. Operation 202 may be performed by one or more components that is the same as or similar to prompt component 108, in accordance with one or more implementations.

An operation 204 may include receiving user input from individual ones of the users. User input from individual ones of the users may indicate responses to the one or more provided prompts. By way of non-limiting illustration, user input from the first user may indicate a first response to the first prompt. Operation 204 may be performed by one or more hardware processors configured by machine-readable instructions including a component that is the same as or similar to input component 110, in accordance with one or more implementations.

An operation 206 may include determining, based on the received user input from individual ones of the users, response information for individual ones of the responses to the prompts. The response information for an individual response may describe one or more of the content of the individual response, the context of the individual response, and/or other information characterizing the individual response. By way of non-limiting illustration, response information may be determined for the first response. Operation 206 may be performed by one or more hardware processors configured by machine-readable instructions including a component that is the same as or similar to input component 110, in accordance with one or more implementations.

An operation 208 may include aggregating the individual responses, corresponding response information, and/or other information to generate response records for individual ones of the users. The response records for individual ones of the users may be structured for use within an application marketplace that facilitates use of individual applications by individual users. The individual applications may utilize one or more models to perform application functions. The one or more models may be capable of being refined based on response records for individual ones of the users to customized outputs generated by the individual models for individual ones of the users. By way of non-limiting illustration, a first response record for the first user may be aggregated based on the first response, response information for the first response, and/or other information. Operation 208 may be performed by one or more hardware processors configured by machine-readable instructions including a component that is the same as or similar to record component 112, in accordance with one or more implementations.

An operation 210 may include storing the response records for individual ones in the users. By way of non-limiting illustration, the first response record for the first user may be stored. Operation 210 may be performed by one or more hardware processors configured by machine-readable instructions including a component that is the same as or similar to record component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to generate response records for individual users based on user responses to prompts, wherein the response records are structured for refining machine learning models to generate customized outputs, the system comprising: one or more physical processors configured by machine-readable instructions to:
provide prompts to individual users, wherein the prompts are presented on one or more user interfaces of client computing platforms associated with individual ones of the users, such that a first prompt is provided to a first user via a first client computing platform associated with the first user;
receive user input from the individual ones of the users, wherein user input from the individual ones of the users indicates responses to the provided prompts, such that first user input from the first user indicates a first response to the first prompt;

determine, based on the received user input from the individual ones of the users, response information for individual ones of the responses to the prompts, wherein response information for an individual response describes one or more of the content of the individual response and/or the context of the individual response, such that response information is determined for the first response;

aggregate the individual responses and corresponding response information to generate response records for the individual ones of the users, wherein an individual response record is associated with an individual user, wherein the response records for individual ones of the users are structured for use within an application marketplace that facilitates use of individual applications by the individual ones of the users, wherein the individual applications utilize one or more machine learning models to perform application functions, and wherein the one or more machine learning models are capable of being refined based on response records for the individual ones of the users to customized outputs generated by the individual machine learning models for the individual ones of the users, such that a first response record for the first user is aggregated based on the first response and/or response information for the first response;

store the response records for the individual ones of the users, such that the first response record for the first user is stored;

receive user input from the individual ones of the users indicating selection of one or more applications, such that second user input from the first user indicates selection of a first application, the first application utilizing a first machine learning model to perform application functions;

refine, based on the stored response records for the individual ones of the users, one or more underlying machine learning models that perform application functions for the one or more selected applications, such that the first machine learning model is refined based on the first response record for the first user; and utilize the one or more refined underlying machine learning models in the performance of application functions of the one or more selected applications for the individual ones of the users, such that the first refined machine learning model is used in the performance of application functions of the first application for the first user.

2. The system of claim 1, wherein the one or more physical processors are further configured by machine-readable instructions to:

analyze the response records for the individual ones of the users, wherein analyzing individual responses includes identifying characteristics and/or features that describe the individual ones of the users.

3. The system of claim 2, wherein analyzing the response records for the individual ones of the users includes identifying, based on the response records for the individual ones of the users, one or more user phenotypes, wherein an individual user phenotype describes a group of users having similar characteristics and/or features, such that a first user phenotype and a second user phenotype are identified, the first user phenotype describing a first group of users and the second user phenotype describing a second group of users, the first group of users being separate and distinct from the second group of users.

4. The system of claim 3, wherein the one or more physical processors are further configured by machine-readable instructions to:

for individual ones of the user phenotypes, determine prompt recommendations that include one or more prompts to provide to users belonging to the individual ones of the user phenotypes, wherein the determination is based on characteristics and/or features that describe the users belonging to the individual ones of the user phenotypes, such that a prompt recommendation including a given prompt is determined for the first user phenotype; and provide the prompts identified by the prompt recommendations, wherein the prompts are provided via client computing platforms associated with the individual users belonging to the individual ones of the user phenotypes, such that the given prompt is provided to individual users belonging to the first user phenotype.

5. The system of claim 3, wherein the one or more physical processors are further configured by machine-readable instructions to:

determine application recommendations for the individual ones of the user phenotypes, wherein the determination is based on characteristics and/or features that describe users belonging to the individual ones of the user phenotypes, wherein an individual application recommendation for an individual user phenotype includes one or more applications; and provide the application recommendations to the individual users belonging to the individual ones of the user phenotypes for which the application recommendations are determined.

6. The system of claim 3, wherein the one or more machine learning models are capable of being refined for an individual user, wherein the one or more machine learning models are capable of being refined based on characteristics and/or features corresponding with a user phenotype that the individual user belongs to.

7. The system of claim 2, wherein the one or more physical processors are further configured by machine-readable instructions to:

determine prompt recommendations for the individual ones of the users, wherein the prompt recommendations include one or more prompts to provide to the individual ones of the users, and wherein the determination is based on characteristics and/or features that describe the individual ones of the users; and for the individual ones of the users, provide the prompts included in the prompt recommendations for the individual ones of the users, wherein the prompts are provided via client computing platforms associated with the individual ones of the users.

8. The system of claim 2, wherein the one or more physical processors are further configured by machine-readable instructions to:

determine response predictions for individual prompts for the individual ones of the users, wherein the response predictions are determined based on characteristics and/or features that describe the individual ones of the users.

9. The system of claim 1, wherein the one or more machine learning models are publicly available models or private models.

10. The system of claim 1, wherein refining the one or more machine learning models includes training the one or more machine learning models on training information, wherein the training information includes the response record for the individual ones of the users.

11. A method for generating response records for individual users based on user responses to prompts, wherein the response records are structured for refining machine learning models to generate customized outputs, the method comprising:

providing prompts to individual users, wherein the prompts are presented on one or more user interfaces of client computing platforms associated with individual ones of the users, including providing a first prompt to a first user via a first client computing platform associated with the first user;

receiving user input from the individual ones of the users, wherein user input from the individual ones of the users indicates responses to the provided prompts, including receiving first user input from the first user that indicates a first response to the first prompt;

determining, based on the received user input from the individual ones of the users, response information for individual ones of the responses to the prompts, wherein response information for an individual response describes one or more of the content of the individual response and/or the context of the individual response, including determining response information for the first response;

aggregating the individual responses and corresponding response information to generate response records for the individual ones of the users, wherein an individual response record is associated with an individual user, wherein the response records for the individual ones of the users are structured for use within an application marketplace that facilitates use of individual applications by the individual ones of the users, wherein the individual applications utilize one or more machine learning models to perform application functions, and wherein the one or more machine learning models are capable of being refined based on response records for the individual ones of the users to customized outputs generated by the individual machine learning models for the individual ones of the users, including aggregating a first response record for the first user based on the first response and/or response information for the first response;

storing the response records for individual ones of the users, including storing the first response record for the first user;

receiving user input from the individual ones of the users indicating selection of one or more applications, including receiving second user input from the first user indicating selection of a first application, the first application utilizing a first machine learning model to perform application functions;

refining, based on the stored response records for the individual ones of the users, one or more underlying machine learning models that perform application functions for the one or more selected application, including refining the first machine learning model based on the first response record for the first user; and utilizing the one or more refined underlying machine learning models in the performance of application functions of the one or more selected applications for the individual ones of the users, such that the first refined machine learning model is used in the performance of application functions of the first application for the first user.

12. The method of claim 11, wherein the method further comprises:

analyzing the response records for the individual ones of the users, wherein analyzing individual responses includes identifying characteristics and/or features that describe the individual ones of the users.

13. The method of claim 12, wherein analyzing the response records for the individual ones of the users includes identifying, based on the response records for the individual ones of the users, one or more user phenotypes, wherein an individual user phenotype describes a group of users having similar characteristics and/or features, including identifying a first user phenotype and a second user phenotype, the first user phenotype describing a first group of users and the second user phenotype describing a second group of users, the first group of users being separate and distinct from the second group of users.

14. The method of claim 13, wherein the method further comprises:

for individual ones of the user phenotypes, determining prompt recommendations that include one or more prompts to provide to users belonging to the individual ones of the user phenotypes, wherein the determination is based on characteristics and/or features that describe the users belonging to the individual ones of the user phenotypes, including determining a prompt recommendation including a given prompt for the first user phenotype; and providing the prompts identified by the prompt recommendations, wherein the prompts are provided via client computing platforms associated with the individual users belonging to the individual ones of the user phenotypes, including providing the given prompt to individual users belonging to the first user phenotype.

15. The method of claim 13, wherein the method further comprises:

determining application recommendations for the individual ones of the user phenotypes, wherein the determination is based on characteristics and/or features that describe users belonging to the individual ones of the user phenotypes, wherein an individual application recommendation for an individual user phenotype includes one or more applications; and providing the application recommendations to the individual users belonging to the individual ones of the user phenotypes for which the application recommendations are determined.

16. The method of claim 13, wherein the one or more machine learning models are capable of being refined for an individual user, wherein the one or more machine learning models are capable of being refined based on characteristics and/or features corresponding with a user phenotype that the individual user belongs to.

17. The method of claim 12, wherein the method further comprises:

determining prompt recommendations for the individual ones of the users, wherein the prompt recommendations include one or more prompts to provide to the individual ones of the users, and wherein the determination is based on characteristics and/or features that describe the individual ones of the users; and for the individual ones of the users, providing the prompts included in the prompt recommendations for the individual ones of the users, wherein the prompts are provided via client computing platforms associated with the individual ones of the users.

18. The method of claim 12, wherein the method further comprises:

determining response predictions for individual prompts for the individual ones of the users, wherein the response predictions are determined based on characteristics and/or features that describe the individual ones of the users.

19. The method of claim 11, wherein the one or more machine learning models are publicly available models or private models.

20. The method of claim 11, wherein refining the one or more machine learning models includes training the one or more machine learning models on training information, wherein the training information includes the response record for the individual ones of the users.

* * * * *